April 15, 1941.   H. DICKENS   2,238,040
POWER CONTROL SYSTEM
Original Filed Feb. 25, 1936   2 Sheets-Sheet 1
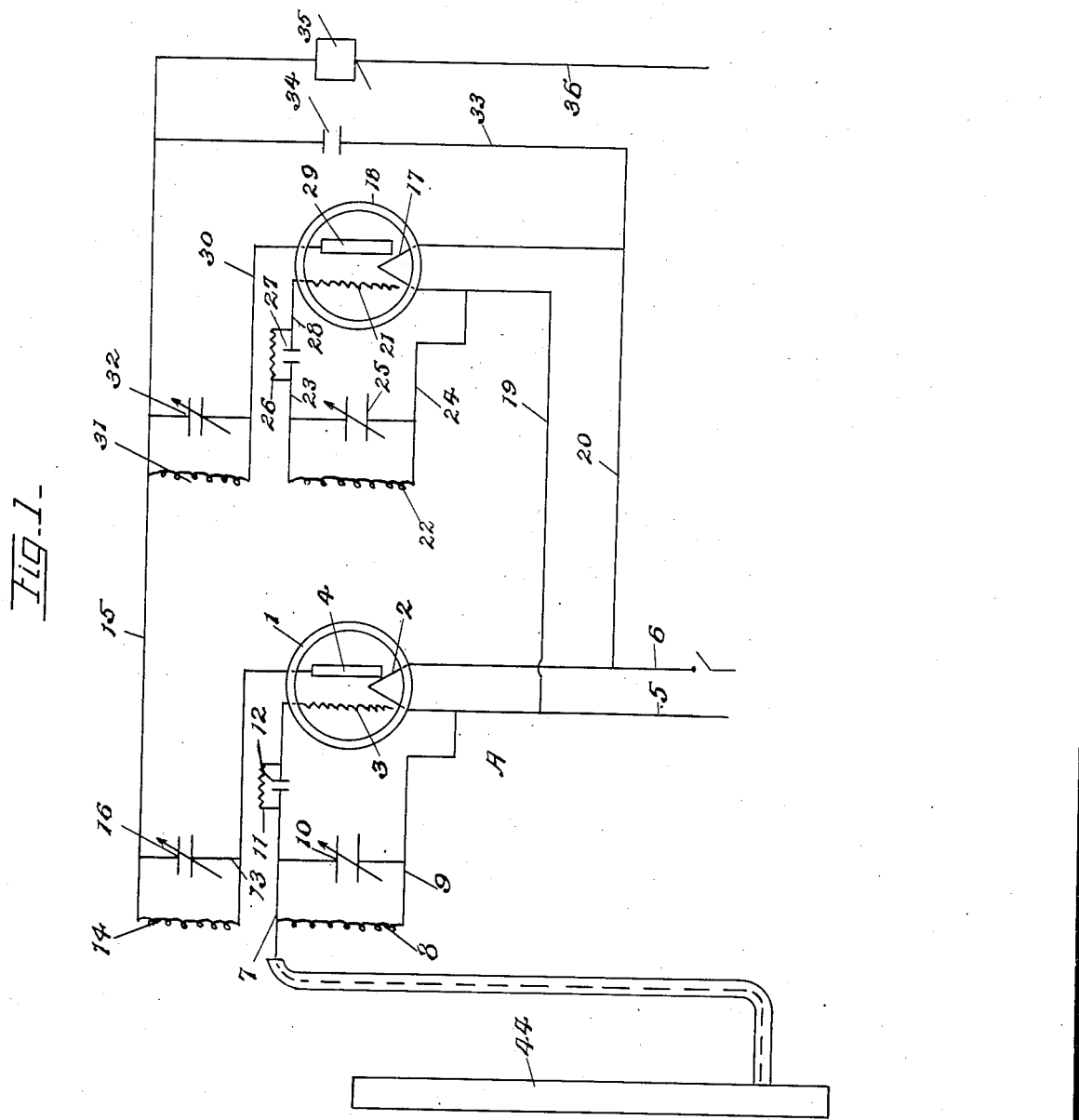
Inventor
Harry Dickens
By
Attorney April 15, 1941.   H. DICKENS   2,238,040
POWER CONTROL SYSTEM
Original Filed Feb. 25, 1936   2 Sheets-Sheet 2
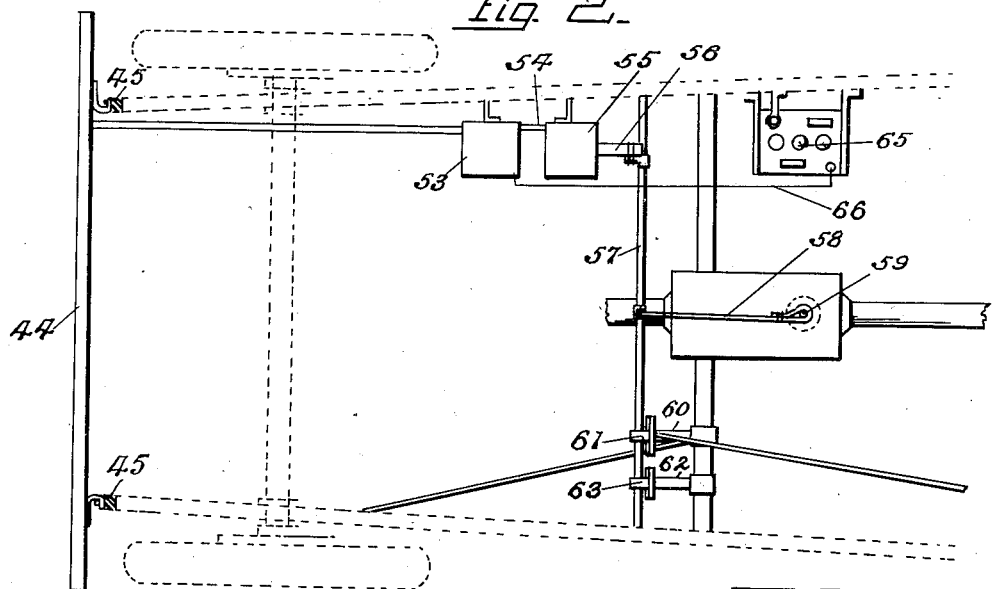
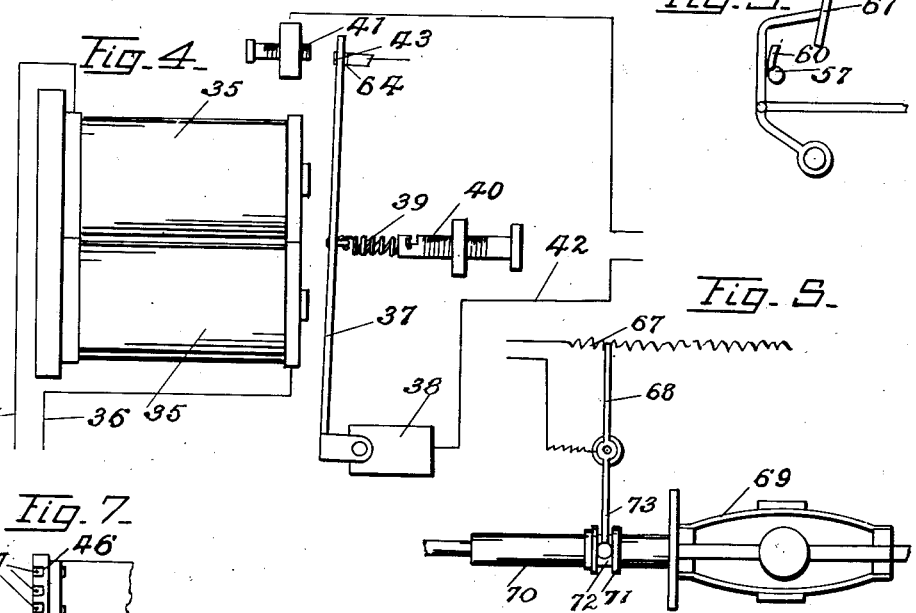
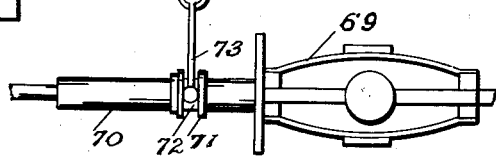
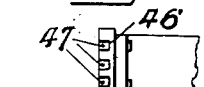
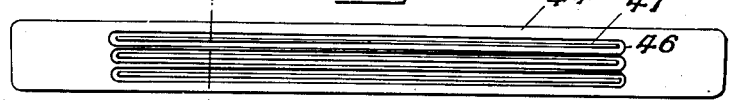
Inventor
Harry Dickens
By
Attorney Patented Apr. 15, 1941

2,238,040

UNITED STATES PATENT OFFICE 2,238,040

POWER CONTROL SYSTEM

Harry Dickens, Jersey City, N. J., assignor to Sensytrol Corporation, Washington, D. C., a corporation of Nevada Application February 25, 1936, Serial No. 65,737
Renewed September 14, 1939

1 Claim. (Cl. 175—320)

This invention is directed to a power controlled system wherein the power initiation results from the presence of an object in or crossing a predetermined path of the system, with such object wholly free of any contact, connection or other relation to the system.

The invention in its broader aspect is without concern as to the function of the power initiated, as obviously such may be used for any purpose, but the invention is concerned with the inauguration and maintenance of the projection of a predetermined path of energy beyond the physical elements of the system with a circuit balanced in its effect on an element or means operating under an unbalanced circuit to close or inaugurate the power circuit, with the circuit maintained balanced during the uninterrupted flow of energy in the predetermined path beyond the physical elements of the system and unbalanced for power inauguration through any physical interruption of such flow of energy in said path.

Therefore, the system may be arranged on an automobile, for example, with the path of electronic discharge leading in advance of the automobile and with the power circuit suitably controlling conventional mechanisms for operating the clutch and setting the brakes of the automobile. Thus, on the interruption of the electronic discharge by the presence in the path of an object causing the reflection of the electrons, such for example as a person crossing the path, the presence of another automobile or any other object which may either move across the path or which is reached by the path in the movement of the vehicle, the primary circuit carried on the automobile and forming a part of the system is unbalanced, the power circuit immediately closed, the clutch opened, and the brakes applied, bringing the automobile to a stop, automatically and entirely free of any human government. Thus, in this one specifically mentioned use, the system lends itself to preventing automobile collisions with either a moving or stationary object and therefore will afford a heretofore unknown safety factor against the loss of human life or serious injury to individuals.

A further object of the invention is the provision of means controlled by the speed of the vehicle which will prevent the inauguration of the system as a whole until the speed of the vehicle has reached a predetermined point. Thus, the vehicle under low speed, in which the danger of collision or injury to a human being is materially reduced in any event, will move freely without the control of the system, thus permitting the automobile to move in congested traffic or even in travel in cities where the speed limit is usually a primary safety factor wholly free of the automatic control by the system; the governing apparatus automaticaly bringing the system into play and function when the vehicle has reached a predetermined speed.

The invention is illustrated in the accompanying drawings, in which:

Figure 1 is a diagrammatic view showing the balanced oscillating circuits.

Figure 2 is a more or less diagrammatic view showing sufficient of an automobile to illustrate the application of the system thereto.

Figure 3 is a detail in side elevation showing the control of the brake pedal by the system.

Figure 4 is a diagrammatic view of the relay controlled by the system for governing the power circuit.

Figure 5 is a more or less diagrammatic view showing the means for inaugurating the system under the speed of the automobile.

Figure 6 is an elevation of a bumper of the automobile showing means for controlling the width of the path for the electronic discharge.

Figure 7 is a section on line 7—7 of Figure 6.

The system as an entirety will first be described without regard to any particular application of such system and thereafter described in connection with several specific applications of use of the system.

Initially, the system includes what may be called and hereinafter referred to as a primary circuit made up, as a matter of fact, of two interrelated circuits. The first of these interrelated circuits of the primary circuit is indicated at A and comprises a vacuum tube 1 including a filament 2, a grid 3 and a plate 4. The filament is of a composition to free electrons when energized and is energized through conductors 5 and 6, the former of which is connected to the negative side of an "A" battery while the latter is connected to the positive side of the "A" battery and the negative side of a "B" battery.

The output from the grid 3 is through a main conductor 7 connected through a coil 8 and conductor 9 to the filament conductor 5. The circuit including the coil 8 and conductors 7 and 9 beyond the tube is bridged by a variable condenser 10, the conductor 7 including a grid resister 11 and a grid by-pass condenser 12. The variable condenser 10 functions as a tuning condenser while the by-pass condenser 12 fits into the grid 3 which has a negative potential.

Under these conditions, there is produced from the filament free electrons which, incident to their rapid accumulation bombard the plate 4, which plate beyond the tube is connected by a conductor 13 to one side of a plate coil 14, the other side of which is connected to a lead 15 to be later referred to. The coil is tuned by a variable plate condenser 16 connected across the coil circuit to produce a capacity effect.

The second circuit B of the primary circuit, which is shielded from the circuit A, is identical with circuit A except that the grid circuit does not include the extended conductor beyond the coil of that circuit. Thus, the circuit B includes a filament 17 arranged in a vacuum tube 18 and energized through conductors 19 and 20 connected with conductors 5 and 6. The grid 21 of the tube 18 is in circuit with a coil 22 including a conductor 23 leading from the grid and a conductor 24 leading to the input of the filament, this circuit having a variable condenser 25 bridged therein for tuning purposes and the conductor 28 including the grid resistor 26 and the grid by-pass condenser 27. The plate 29 of the vacuum tube is connected through a conductor 30 to a plate coil 31 in circuit with conductor 15, a variable plate condenser 32 bridging the circuit for coil tuning purposes. The conductor 20 is extended beyond the tube filament and connected to the conductor 15, as at 33, this conductor including a by-pass condenser 34 for capacity effect.

In connection with the primary circuit, there is a controlled element functioning as a circuit closer for the power circuit. This controlled element is shown, for simplification, as a relay. The relay as shown is of the electromagnetic type, the coils 35 being in circuit with conductor 15 of the primary circuit and with the positive side of the "B" battery, as through conductor 36. The armature 37 of the coils is swingingly supported on a block 38 with its resistance to the pull of the electromagnets adjustably controlled through a spring 39, the tension of which is conveniently adjustable, as at 40. The upper end of the armature 37 carries a contact point to engage a contact 41 which, with the block 38, form the terminals of a power circuit 42, a stop 43 limiting the opening movement of the armature under the influence of the spring 39.

The combined functions of the circuits making up the primary circuit are as follows: Each circuit A and B produces oscillations which are tuned by the condensers 10, 16, 25 and 32 until they are placed in virtually perfect balance and beating against each other. This, it will be readily understood, is secured by the coils 8 and 14 in the circuit A and coils 22 and 31 in the circuit B, which coils are so spaced with relation to each other that they cause the electrons in the vacuum tube to oscillate and these electrons in their bombardment within the tubes are feeding back through the outlet 15. The discharge outlet is at the plate coil 14 of circuit A. Where the electrons pass over to the grid coil 8 by induction and being repelled from the circuit, they feed through conductor 7 to provide the electronic discharge.

In connection with the system for use on an automobile or other moving vehicle, the electronic discharge is preferably directed through the bumper at the front of the automobile, indicated at 44. This bumper, for the purpose of the present invention, is electrically insulated by conventional parts 45 from the vehicle proper, and is further formed with longitudinally extending channels 46. In one or more of these channels are arranged electrical conductors 47 which are in electrical connection with the lead 7 of the primary circuit. This lead 7 is, of course, properly insulated throughout its length, that is effectively shielded from the metal of the vehicle, and the use of the conductors 47 obviously determines by their length the width of the path of the electronic discharge referred to. That is to say, if these conductors are short, the path will be correspondingly narrow and any desired width of path within the length of the available area of the bumper proper may be provided by corresponding length of the conductors.

For use in connection with an automobile, the primary circuit and relay are preferably enclosed in a casing indicated at 53 and the power circuit 42 includes a source of energy 54 and an electro-magnet 55. The movable core of the electromagnet is connected through suitable links or rods 56 to a shaft 57 mounted for rotation on the chassis. This shaft is provided with an arm extension 58 which, when the shaft is operated, shifts the conventional gear shaft 59 of the automobile into neutral. The shaft 57 has a further arm 60 which, when the shaft is actuated, operates the conventional brake lever 61 to set the brakes of the vehicle, the shaft 57 having a further arm 62 which, when the shaft is actuated, operates the clutch lever 63 into open or declutching position.

Thus, when the armature 37 is attracted by the relay coils, the lower circuit is closed, the electromagnet 55 operated, the transmission shifted into neutral, the clutch opened and the brakes applied. If desired, the armature 37 may have a contact point 64 which, together with the element previously described as a stop and indicated at 43, may form part of the ignition circuit from the conventional automobile battery 65 through the live conductor 66, the other wire of the circuit being, of course, grounded through the chassis. When the armature 37 is, therefore, in inoperative position, as when the electronic discharge is proceeding without interruption, the ignition circuit of the automobile remains intact, but immediately upon the effective actuation of the system and the consequent attraction of the armature 37, the ignition circuit is broken and the engine stopped in addition to the control of the other governing parts of the travel of the vehicle, as above described.

It is recognized as a more or less important adjunct that the system shall remain ineffective during low speed travel of the automobile in order to permit ordinary travel and control in traffic in cities or under other conditions where the system is not desired for use. To provide for accomplishing this result in an automatic manner, so that during low or other speeds in which it is advisable that the system be not effective, automatic cut-out will occur and when the speed of the vehicle reaches a point at which control by the system is desired, such system will automatically become effective.

This result may be accomplished through many simple and conventional means. One such, for example, is to arrange in the circuit of the "B" battery a resistance 67 over which an arm 68 included in the "B" battery circuit is mounted for travel under the influence of a governor 69. The shaft 70 of this governor may be connected to the speedometer and provided with a collar 71 with an annular channel 72 receiving a yoke 73 rigid with the arm 68. With the parts properly constructed and arranged, the resistance to the flow of the "B" battery circuit and thus the operation of the primary circuit of the system will be prevented by the included resistances in the position of the arm until the speed of the automobile and the consequent operation of the governor reduces the resistance to the point where the primary circuit becomes effective for the purposes of the system. Thus, during the travel of the automobile at any speed below its selected maximum, the system is ineffective and becomes automatically effective at any speed in excess of that selected. The parts providing for this are so conventional that no description other than that referred to above is considered necessary.

What is claimed to be new is:

A control for power circuits, comprising two substantially identical thermionic oscillators connected in parallel to each other, each oscillator including a grid circuit having a coil and a tuning condenser and a plate circuit connected through a coil and a tuning condenser to a source of plate current supply, a relay interposed in the plate circuit between said source of supply and said oscillators, the grid circuit of one of said oscillators directing its radiant energy in a beam, said oscillators normally maintaining said relay in one position during unobstructed flow of radiant energy from the grid circuit, obstruction of said radiant energy flow reacting on the system to shift the energy distribution between the two oscillators and thereby cause a plate current change in each oscillator, whereby the change in plate current to the two oscillators causes operation of the relay to a different position.

HARRY DICKENS.